(12) United States Patent
Zhu

(10) Patent No.: US 11,871,430 B2
(45) Date of Patent: Jan. 9, 2024

(54) DOWNLINK CONTROL CHANNEL RECEIVING AND TRANSMITTING METHOD AND DEVICE

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/828,311

(22) Filed: May 31, 2022

(65) Prior Publication Data

US 2022/0295461 A1  Sep. 15, 2022

Related U.S. Application Data

(63) Continuation of application No. 16/609,523, filed as application No. PCT/CN2017/082883 on May 3, 2017, now Pat. No. 11,382,084.

(51) Int. Cl.
*H04W 72/23* (2023.01)
*H04W 48/12* (2009.01)

(52) U.S. Cl.
CPC ........... *H04W 72/23* (2023.01); *H04W 48/12* (2013.01)

(58) Field of Classification Search
CPC ............... H04W 72/042; H04W 48/12; H04W 72/1289; H04W 48/10; H04L 5/0023; H04L 5/0091; H04L 5/0053
See application file for complete search history.

(56) References Cited

U.S. PATENT DOCUMENTS

| | | | |
|---|---|---|---|
| 2014/0286277 A1 | 9/2014 | Jang et al. | |
| 2014/0321383 A1 | 10/2014 | Wu et al. | |
| 2016/0338011 A1* | 11/2016 | Mizusawa | H04W 72/23 |
| 2017/0041923 A1* | 2/2017 | Park | H04L 5/0053 |
| 2017/0245250 A1* | 8/2017 | Zhang | H04L 5/0094 |
| 2018/0124815 A1* | 5/2018 | Papasakellariou | H04L 5/0053 |
| 2018/0234952 A1 | 8/2018 | Shi et al. | |
| 2019/0036746 A1* | 1/2019 | Hwang | H04W 4/80 |

(Continued)

FOREIGN PATENT DOCUMENTS

| | | |
|---|---|---|
| CN | 101472323 A | 7/2009 |
| CN | 101478808 A | 7/2009 |

(Continued)

OTHER PUBLICATIONS

Intel Corporation UL control channel design with long duration; R1-1611995 Nov. 2016 (Year: 2016).*

(Continued)

*Primary Examiner* — Charles C Jiang
*Assistant Examiner* — Shawn D Miller
(74) *Attorney, Agent, or Firm* — Finnegan, Henderson, Farabow, Garrett & Dunner, L.L.P.

(57) ABSTRACT

Provided in the present disclosure are a downlink control channel receiving and transmitting method and device. The method includes: determining a target receiving manner to be used for receiving a downlink control channel; and receiving, according to the target receiving manner, the downlink control channel sent by a base station. The present disclosure enables a terminal to receive a downlink control channel according to a target receiving manner, thus improving performance of a 5G system.

17 Claims, 8 Drawing Sheets

(56) References Cited

U.S. PATENT DOCUMENTS

| | | | |
|---|---|---|---|
| 2019/0230694 A1* | 7/2019 | Lyu | H04W 64/003 |
| 2019/0239204 A1 | 8/2019 | Zhang et al. | |
| 2019/0363839 A1* | 11/2019 | Liu | H04L 5/0044 |
| 2019/0379567 A1* | 12/2019 | Kuchi | H04B 1/69 |
| 2020/0092876 A1* | 3/2020 | Cho | H04W 72/0413 |
| 2020/0112467 A1* | 4/2020 | Shen | H04L 27/2621 |
| 2020/0128542 A1* | 4/2020 | Tang | H04W 72/0453 |
| 2020/0267710 A1 | 8/2020 | Zhang et al. | |

FOREIGN PATENT DOCUMENTS

| | | |
|---|---|---|
| CN | 101841892 A | 9/2010 |
| CN | 102149168 A | 8/2011 |
| CN | 102186251 A | 9/2011 |
| CN | 102594513 A | 7/2012 |
| CN | 102724575 A | 10/2012 |
| CN | 102724757 A | 10/2012 |
| CN | 103313404 A | 9/2013 |
| CN | 103391264 A | 11/2013 |
| CN | 103546871 A | 1/2014 |
| JP | 2012235341 A | 11/2012 |
| JP | 2015/536079 A | 12/2015 |
| KR | 10-2007-0098460 A | 10/2007 |
| RU | 2487496 C2 | 7/2013 |
| WO | WO 2013/015445 A1 | 1/2013 |
| WO | WO 2016/070424 A1 | 5/2016 |
| WO | WO 2016/105126 A1 | 6/2016 |
| WO | WO 2017/052078 A1 | 3/2017 |

OTHER PUBLICATIONS

Motorola resource allocation for short PUCCH; R1 1705554 (Year: 2017).*
Extended European Search Report for European Application No. 17908508.9, dated Apr. 15, 2020.
International Search Report for International Application No. PCT/CN2017/082883, dated Jan. 31, 2018.
NTT Docomo, Inc., "Discussion and evaluation on NR-PBCH design", 3GPP TSG RAN WG1 Meeting #88bis, Spokane, USA, Apr. 3-7, 2017, 7 pgs.
NTT Docomo, Inc., Discussion on remaining system information delivery in NR, 3GPP TSG RAN WG1 Meeting #88bis, Spokane, USA, Apr. 3-7, 2017, 3 pgs.
Office Action of Russian Application No. 2019137929/07, dated Jul. 29, 2020.
AT&T, Attachment of UE-ID for common PDCCH, 3GPP TSG RAN WG1 Meeting #88bis, R1-1704350, Apr. 3-7, 2017, Spokane, USA, 4 pgs.
Huawei, HiSilicon, Discussion on NR-PDCCH structure, 3GPP TSG RAN WG1 Meeting #88bis, R1-1704204, Spokane, USA, Apr. 3-7, 2017, 4 pgs.
NTT Docomo, Inc., Discussion on SS block composition, SS burst set composition and SS block index indication for NR, 3GPP TSG RAN WG1 Meeting #88bis, R1-1705705, Spokane, USA, Apr. 3-7, 2017, 8 pgs.
Notification of Reason for Refusal from the Japanese Patent Office in counterpart Japan Application No. 2019-553490 dated Feb. 9, 2021.

* cited by examiner

DOWNLINK CONTROL CHANNEL RECEIVING AND TRANSMITTING METHOD AND DEVICE

CROSS-REFERENCE TO RELATED APPLICATION

This application is a continuation of U.S. patent application Ser. No. 16/609,523 filed Oct. 30, 2019, which is a national phase application based on International Application No. PCT/CN2017/082883 filed on May 3, 2017, the entire contents of both of which are incorporated herein by reference.

TECHNICAL FIELD

The present disclosure relates to the field of communications, and in particular, to a method and an apparatus for receiving and transmitting a downlink control channel.

BACKGROUND

In the related art, the transmission of the downlink control channel, such as the Physical Downlink Control Channel (PDCCH), is carried over the entire carrier bandwidth, and the terminal obtains the search space of the PDCCH according to the provisions in the communication protocol, and then detects whether there is the PDCCH.

However, in 5G systems, some terminals cannot support relatively large carrier bandwidths. Therefore, if the existing technical solution is used, the terminal may not be able to receive the downlink control channel.

SUMMARY

In order to overcome the problems in the related art, the embodiments of the present disclosure provide a method and an apparatus for receiving and acquiring a downlink control channel.

According to a first aspect of the embodiments of the present disclosure, there is provided a method for receiving a downlink control channel, applied in a terminal, the method including:
  determining a target receiving manner for receiving the downlink control channel; and
  receiving the downlink control channel transmitted by a base station according to the target receiving manner.
  Optionally, the determining the target receiving manner for receiving the downlink control channel includes:
  adopting a preset receiving manner corresponding to the downlink control channel in a communication protocol between the terminal and the base station as the target receiving manner for receiving the downlink control channel.
  Optionally, the determining the target receiving manner for receiving the downlink control channel includes:
  receiving the target receiving manner for receiving the downlink control channel transmitted by the base station using a target signaling; and
  wherein the target signaling includes at least one of:
  a radio resource control signaling, system information, a media access control address control unit, and a physical layer signaling.
  Optionally, the determining the target receiving manner for receiving the downlink control channel includes:
  determining target association information associated with the downlink control channel; and
  adopting a receiving manner corresponding to the target association information as the target receiving manner for receiving the downlink control channel according to a pre-stored corresponding relationship between receiving manners and association information.
  Optionally, the association information includes at least one of:
  a scrambling sequence for scrambling target information, wherein the target information is information corresponding to a channel or an information block received by the terminal before receiving the downlink control channel; and
  a terminal grouping to which the terminal belongs.
  Optionally, the target receiving manner includes at least one of:
  receiving information about a target location of the downlink control channel corresponding to a time domain resource and a frequency domain resource;
  searching a target search space corresponding to the downlink control channel;
  receiving according to a target modulation and coding manner;
  receiving according to a target period; and
  receiving a target beam for transmitting the downlink control channel.
  Optionally, the target location includes:
  an offset of the downlink control channel with respect to target information, wherein the target information is information corresponding to a channel or an information block received by the terminal before receiving the downlink control channel; or
  a preset location corresponding to the downlink control channel.

According to a second aspect of the embodiments of the present disclosure, there is provided a method for transmitting a downlink control channel, applied in a base station, the method including:
  transmitting a target receiving manner for receiving the downlink control channel to a terminal; and
  transmitting the downlink control channel to the terminal, so that the terminal receives the downlink control channel according to the target receiving manner.
  Optionally, the transmitting the target receiving manner for receiving the downlink control channel to the terminal includes:
  transmitting the target receiving manner for receiving the downlink control channel to the terminal by a target signaling; and
  wherein the target signaling includes at least one of:
  a radio resource control signaling, system information, a media access control address control unit, and a physical layer signaling.
  Optionally, the target receiving manner includes at least one of:
  receiving information about a target location of the downlink control channel corresponding to a time domain resource and a frequency domain resource;
  searching a target search space corresponding to the downlink control channel;
  receiving according to a target modulation and coding manner;
  receiving according to a target period; and
  receiving a target beam for transmitting the downlink control channel.
  Optionally, the target location includes:
  an offset of the downlink control channel with respect to the target information, wherein the target information is information corresponding to a channel or an information block received by the terminal before receiving the downlink control channel; or a preset location corresponding to the downlink control channel.

According to a third aspect of the embodiments of the present disclosure, there is provided an apparatus for receiving a downlink control channel, applied in a terminal, the apparatus including:

a receiving manner determining module, configured to determine a target receiving manner for receiving the downlink control channel; and a channel receiving module, configured to receive the downlink control channel transmitted by the base station according to the target receiving manner.

Optionally, the receiving manner determining module includes:

a first determining submodule, configured to adopt a preset receiving manner corresponding to the downlink control channel in a communication protocol between the terminal and a base station as the target receiving manner for receiving the downlink control channel.

Optionally, the receiving manner determining module includes:

a receiving submodule, configured to receive the target receiving manner for receiving the downlink control channel transmitted by the base station using a target signaling; and wherein the target signaling includes at least one of:

a radio resource control signaling, system information, a media access control address control unit, and a physical layer signaling.

Optionally, the receiving manner determining module includes:

a second determining submodule, configured to determine target association information associated with the downlink control channel; and a third determining submodule, configured to adopt a receiving manner corresponding to the target association information as the target receiving manner for receiving the downlink control channel according to a pre-stored corresponding relationship between receiving manners and association information.

Optionally, the association information includes at least one of:

a scrambling sequence for scrambling target information; wherein the target information is information corresponding to a channel or an information block received by the terminal before receiving the downlink control channel; and a terminal grouping to which the terminal belongs.

Optionally, the target receiving manner includes at least one of:

receiving information about a target location of the downlink control channel corresponding to a time domain resource and a frequency domain resource;

searching a target search space corresponding to the downlink control channel;

receiving according to a target modulation and coding manner;

receiving according to a target period; and receiving a target beam for transmitting the downlink control channel.

Optionally, the target location includes:

an offset of the downlink control channel with respect to target information, wherein the target information is information corresponding to a channel or an information block received by the terminal before receiving the downlink control channel; or a preset location corresponding to the downlink control channel.

According to a fourth aspect of the embodiments of the present disclosure, there is provided an apparatus for transmitting a downlink control channel, applied in a base station, the apparatus including:

a receiving manner transmitting module, configured to transmit a target receiving manner for receiving the downlink control channel to a terminal; and a channel transmitting module, configured to transmit the downlink control channel to the terminal, so that the terminal receives the downlink control channel according to the target receiving manner.

Optionally, the receiving manner transmitting module includes:

a transmitting submodule, configured to transmit the target receiving manner for receiving the downlink control channel to the terminal by a target signaling; and wherein the target signaling includes at least one of:

a radio resource control signaling, system information, a media access control address control unit, and a physical layer signaling.

Optionally, the target receiving manner includes at least one of:

receiving information about a target location of the downlink control channel corresponding to a time domain resource and a frequency domain resource;

searching a target search space corresponding to the downlink control channel;

receiving according to a target modulation and coding manner;

receiving according to a target period; and receiving a target beam for transmitting the downlink control channel.

Optionally, the target location includes:

an offset of the downlink control channel with respect to the target information, wherein the target information is information corresponding to a channel or an information block received by the terminal before receiving the downlink control channel; or a preset location corresponding to the downlink control channel.

According to a fifth aspect of the embodiments of the present disclosure, there is provided a computer readable storage medium storing a computer program for performing the method for receiving a downlink control channel according to the first aspect.

According to a sixth aspect of the embodiments of the present disclosure, there is provided a computer readable storage medium storing a computer program for performing the method for transmitting a downlink control channel according to the second aspect.

According to a seventh aspect of the embodiments of the present disclosure, there is provided an apparatus for receiving a downlink control channel, applied in a terminal, the apparatus including:

a processor; and a memory for storing instructions executable by the processor;

wherein the processor is configured to:

determine a target receiving manner for receiving the downlink control channel; and receive the downlink control channel transmitted by a base station according to the target receiving manner.

According to an eighth aspect of the embodiments of the present disclosure, there is provided an apparatus for transmitting a downlink control channel, applied in a base station, the apparatus including:

a processor;

a memory for storing instructions executable by the processor;

wherein the processor is configured to:

transmit a target receiving manner for receiving the downlink control channel to a terminal; and transmit the downlink control channel to the terminal, so that the terminal receives the downlink control channel according to the target receiving manner.

The technical solutions provided by the embodiments of the present disclosure may include the following beneficial effects.

In the embodiments of the present disclosure, the terminal may first determine a target receiving manner for receiving the downlink control channel, and then receive the downlink control channel sent by the base station according to the target receiving manner. Through the above process, the purpose of receiving the downlink control channel by the terminal according to the target receiving manner is achieved, and the performance of the 5G system is improved.

In the embodiments of the present disclosure, when determining the target receiving manner, the terminal may use the preset receiving manner corresponding to the downlink control channel as the target receiving manner based on the communication protocol between the terminal and the base station; or may receive the target receiving manner that is sent by the base station using the target signaling; or after determining the target association information associated with the downlink control channel, using the receiving manner corresponding to the target association information as the target receiving manner for receiving the downlink control channel according to the pre-stored corresponding relationship between the receiving manners and the association information. Through the above process, the terminal can determine the target receiving manner for receiving the downlink control channel, which is simple to implement and has a high availability.

In the embodiments of the present disclosure, optionally, when receiving the downlink control channel according to the target receiving manner, the terminal may receive information about the target location of the downlink control channel corresponding to the time domain resource and the frequency domain resource; or searching a target search space corresponding to the downlink control channel, thereby obtaining the downlink control channel; or receiving according to a target modulation and coding manner; or receiving the downlink control channel according to a target period; or receiving a target beam for transmitting the downlink control channel Through the foregoing process, the terminal can receive the downlink control channel according to the receiving manner indicated by the target receiving manner, so as to avoid the problem that the terminal cannot receive the downlink control channel.

In the embodiments of the present disclosure, the base station may send a target receiving manner for receiving the downlink control channel to the terminal, and send the downlink control channel to the terminal. Therefore, the terminal receives the downlink control channel according to the target receiving manner. Through the foregoing process, the base station can send the target receiving manner and the downlink control channel to the terminal, so that the terminal receives the downlink control channel according to the target receiving manner, and improves the performance of the 5G system.

In the embodiments of the present disclosure, the base station may send the target receiving manner to the terminal by using the target signaling. Optionally, the target signaling includes at least one of the following: radio resource control signaling, system information, a media access control address control unit and physical layer signaling. The implementation is easy and the availability is high.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The terms used in the present disclosure only tend to depict specific embodiments, rather than restricting the present disclosure. Unless the exceptional case in which the context clearly gives supports, the singular forms "a", "an", and "the" used in the present disclosure and accompany claims are intended to include the plural forms. It should also be appreciated that the expression "and/or" used herein indicates including any and all possible combinations of one or more of the associated listed items.

It should be understood, although terms first, second, third and the like are used in the present disclosure to depict various information, such information is not restricted by these terms. These terms are only used to distinguish information of the same type from each other. For example, without departing from the scope of the present disclosure, the first information may also be referred to as the second information. Similarly, the second information may also be referred to as the first information. Depending on context, the word "if" used herein may be explained to "when" or "upon" or "in response to determining . . . ".

Figure 1:
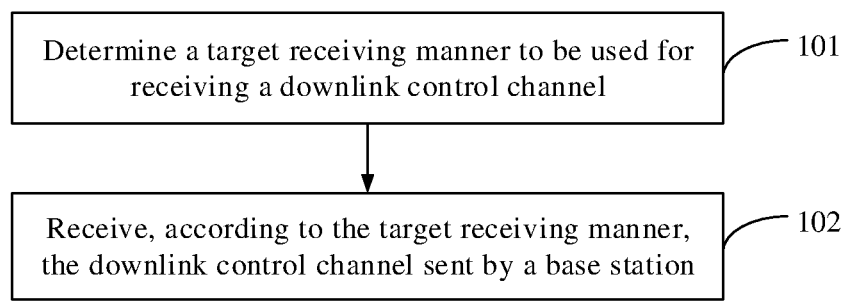
FIG. 1 is a flowchart of a method for receiving a downlink control channel according to an exemplary embodiment.

An embodiment of the present disclosure provides a method for receiving a downlink control channel, which may be used in a terminal. Optionally, the downlink control channel is a downlink control channel for transmitting common control information, such as a PDCCH. FIG. 1 is a flowchart of a method for receiving a downlink control channel according to an exemplary embodiment, which may include the following steps.

In step 101, a target receiving manner for receiving the downlink control channel is determined.

In step 102, the downlink control channel transmitted by a base station is received according to the target receiving manner.

In the foregoing embodiment, the terminal may first determine a target receiving manner for receiving the downlink control channel, and then receive the downlink control channel sent by the base station according to the target receiving manner. Through the above process, the purpose of receiving the downlink control channel by the terminal according to the target receiving manner is achieved, and the performance of the 5G system is improved.

For the above step 101, optionally, the terminal may determine the target receiving manner by using at least one of the following manners.

In a first manner, the target receiving manner is determined by a communication protocol.

In this manner, a preset receiving manner corresponding to the downlink control channel is preset in the communication protocol between the terminal and the base station, and the terminal directly adopts the preset receiving manner as the target receiving method.

In a second manner, the target receiving manner is determined by target signaling sent by the base station.

Optionally, the target signaling includes at least one of the following: radio resource control signaling, system information, a media access control address control unit, and physical layer signaling.

In the embodiment of the present disclosure, the base station may send the target receiving manner to the terminal by sending a Radio Resource Control (RRC) signaling, a system message, a MAC Control Element (MAC CE), or a physical layer signaling to the terminal, and the terminal directly receives it. The physical layer signaling generally refers to signaling carried by the PDCCH.

In a third manner, the target receiving manner may be determined according to association information associated with the downlink control channel.

Figure 2:
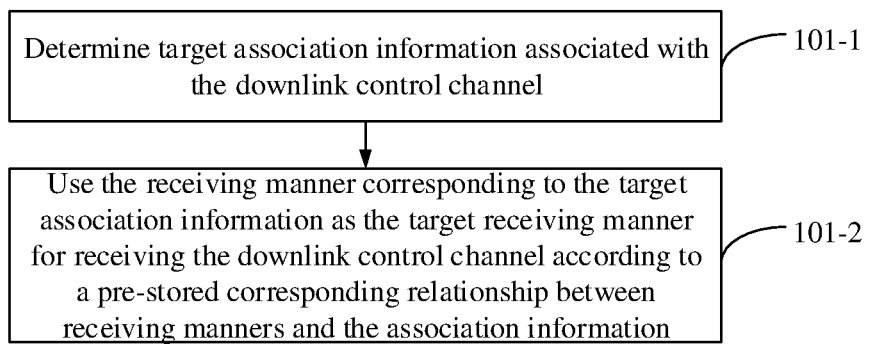
FIG. 2 is a flowchart of another method for receiving a downlink control channel according to an exemplary embodiment.

Optionally, the step 101 is shown in FIG. 2. FIG. 2 is a flowchart of another method for receiving a downlink control channel based on the embodiment shown in FIG. 1, and the method may include the following steps.

In step 101-1, target association information associated with the downlink control channel is determined.

In the embodiment of the present disclosure, the association information may be a scrambling sequence that scrambles target information, where the target information is information corresponding to a channel or an information block received by the terminal before receiving the downlink control channel.

Optionally, the target information may be information corresponding to a Physical Broadcast Channel (PBCH) or information corresponding to a Synchronization Information Block (SS block), and the SS block includes at least a Primary Synchronization Signal (PSS), the PBCH and a Secondary Synchronization Signal (SSS).

The terminal may attempt to demodulate the target information according to a related technology by using a plurality of pre-stored scrambling sequences, and the scrambling sequence that can successfully demodulate the target information is the target association information.

In addition, the association information may also be a terminal grouping to which the terminal currently belongs.

The terminal groupinging is grouping terminals according to a service type or a transmission characteristic of the terminals. For example, when grouping according to the service type, the terminals may be grouped according to different service types of supporting the Enhance Mobile Broadband (EMBB) service and supporting Ultra Reliable & Low Latency Communication (URLLC) service.

When grouping according to the transmission characteristics, the terminals may be grouped according to the direction of the transmission beam of the base station corresponding to the terminal when the base station performs a beam scanning in the current cell, or the length of the cyclic prefix, or the time interval for responding to various requests sent by the network side by the terminal.

In the embodiments of the present disclosure, the terminal has pre-stored the terminal grouping to which the terminal belongs or receives the terminal grouping to which the terminal belongs that is sent by the base station according to the target signaling, and then uses the terminal grouping to which the terminal belongs as the target association information.

In step 101-2, the receiving manner corresponding to the target association information is used as the target receiving manner for receiving the downlink control channel according to a pre-stored corresponding relationship between the receiving manners and the association information.

In the embodiments of the present disclosure, optionally, when the association information is a scrambling sequence, and the corresponding relationship may be as shown in Table 1 below.

TABLE 1

| Association information | Receiving manner |
| --- | --- |
| Scrambling sequence 1 | Receiving manner 1 |
| Scrambling sequence 2 | Receiving manner 2 |
| . . . | . . . |
| Scrambling sequence N | Receiving manner N |

When the association information is the terminal groupinging, the corresponding relationship may be as shown in Table 2 below.

TABLE 2

| Association information | Receiving manner |
| --- | --- |
| Terminal grouping 1 | Receiving manner 1 |
| Terminal grouping 2 | Receiving manner 2 |
| . . . | . . . |
| Terminal grouping N | Receiving manner N |

In this step, the terminal may directly use the receiving manner corresponding to the target association information as the target receiving manner according to Table 1 or Table 2.

In the embodiments of the present disclosure, the terminal may further determine the target receiving manner by combining any two of the above three manners, for example, pre-defining a part of the target receiving manner by using a communication protocol, and sending the remaining by the base station to the terminal using the target signaling. Alternatively, the above three manners may be used simultaneously to determine the target receiving manner.

In the foregoing embodiment, when determining the target receiving manner, the terminal may use a preset receiving manner corresponding to the downlink control channel as the target receiving manner according to a communication protocol between the terminal and the base station; or may receive the target receiving manner sent by the base station by using the target signaling; or after determining the target association information associated with the downlink control channel, using the receiving manner corresponding to the target association information the target receiving manner for receiving the downlink control channel according to the pre-stored corresponding relationship between the receiving manners and the association information. Through the above process, the terminal can determine the target receiving manner for receiving the downlink control channel, which is simple to implement and has a high availability.

In the above step 102, after determining the target receiving manner, the terminal may directly receive the downlink control channel according to the target receiving manner. Optionally, the target receiving manner includes at least one of the following:

receiving information about a target location of the downlink control channel corresponding to the time domain resource and the frequency domain resource;

searching a target search space corresponding to the downlink control channel;

receiving according to a target modulation and coding manner;

receiving according to a target period; and receiving a target beam for transmitting the downlink control channel.

Correspondingly, the terminal may receive the downlink control channel according to the target receiving manner in the following manner.

In a first manner, the terminal may receive information about a target location corresponding to a time domain resource and a frequency domain resource indicated by the target receiving manner, where the information is information corresponding to the downlink control channel.

In a second manner, the terminal may search a target search space indicated by the target receiving manner, thereby obtaining the downlink control channel.

Optionally, the target search space may include location information of the downlink control channel, aggregation degree information of the downlink control channel, and the like. The terminal searches according to the aggregation degree information at a position indicated by the possible location information of the downlink control channel, so that the downlink control channel can be obtained.

In a third manner, the terminal may receive according to a target modulation and coding manner.

In this manner, the terminal may demodulate the downlink control channel according to the target modulation and coding manner, thereby obtaining the downlink control channel.

In a fourth manner, the terminal may receive the downlink control channel according to a target period.

In an embodiment of the present disclosure, the target period may be predefined in a communication protocol, or determined by the base station and sent to the terminal by the target signaling.

It should be noted that the period duration of transmitting the downlink control channel by the base station and the period duration of the target period in which the terminal receives the downlink control channel may be the same or different.

For example, the base station may send the downlink control channel in a period of 5 milliseconds, and the terminal may also receive the downlink control channel by using a target period of 5 milliseconds, or may use other durations, for example, a target period of 10 milliseconds is used to receive the downlink control channel.

In a fifth manner, the base station sends the downlink control channel by using a target beam, and the base station may receive the target beam indicated by the target receiving manner.

In the above embodiment, when receiving the downlink control channel according to the target receiving manner, the terminal may receive information about the target location of the downlink control channel corresponding to the time domain resource and the frequency domain resource; or search the target search space corresponding to the downlink control channel to obtain the downlink control channel; or receive the downlink control channel according to the target period; or receive the target beam for transmitting the downlink control channel Through the foregoing process, the terminal can receive the downlink control channel according to the receiving manner indicated by the target receiving manner, so as to avoid the problem that the terminal cannot receive the downlink control channel.

In an embodiment, if the above target receiving manner includes receiving information about the target location of the downlink control channel corresponding to the time domain resource and the frequency domain resource, the target location may be an offset of the downlink control channel with respect to the target information; where the target information is information corresponding to a channel or an information block received by the terminal before receiving the downlink control channel.

Figure 3A:
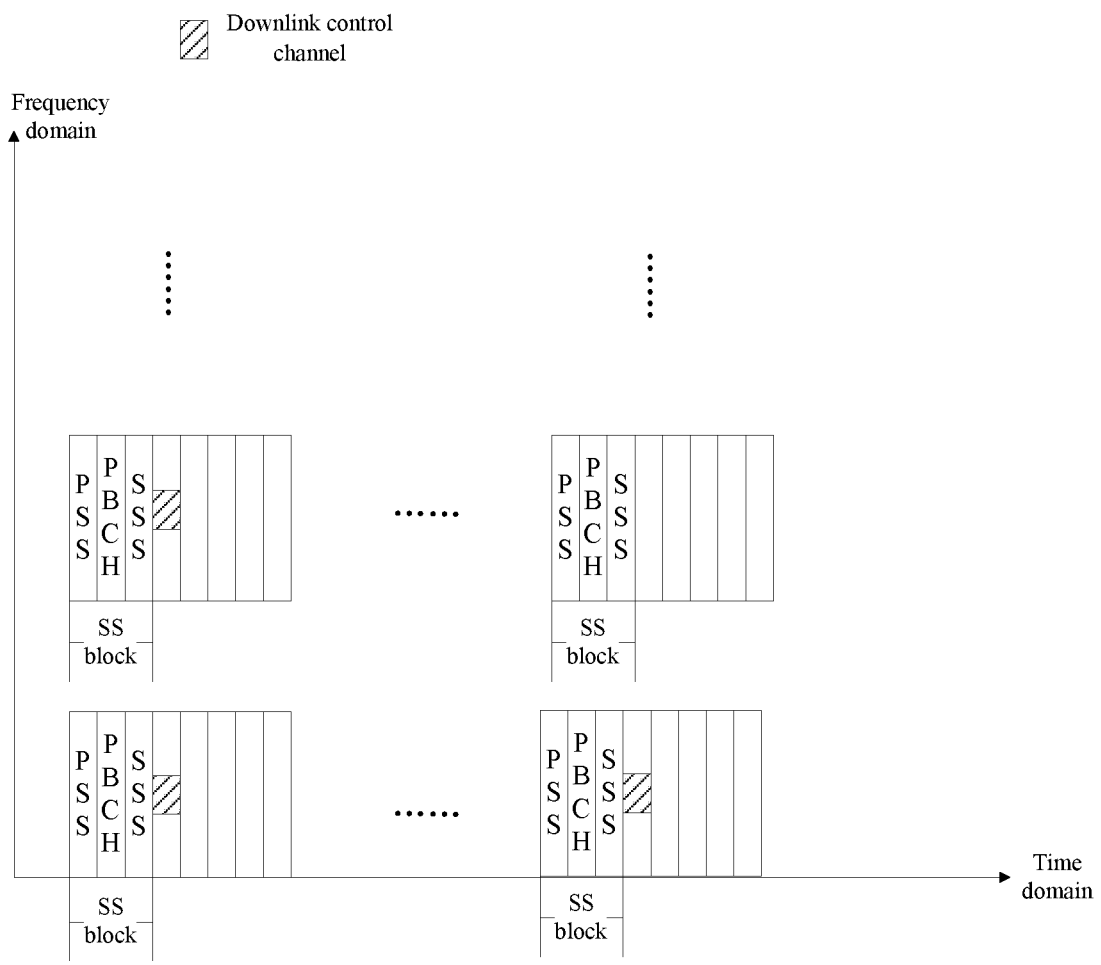
FIGS. 3A to 3B are schematic diagrams showing scenarios of receiving a downlink control channel according to an exemplary embodiment.

For example, as shown in FIG. 3A, the target information may be information corresponding to a PBCH or an SS block, and the offset of the downlink control channel with respect to the target information is defined in the communication protocol in advance. Assuming that the offset of the downlink control channel with respect to the SS block is 1, the terminal may directly search for the target location where the downlink control channel is located in the time domain unit behind the SS block after receiving the target information.

It should be noted that, in the above embodiment, if the terminal has multiple SS blocks in multiple time domain and frequency domain locations on one carrier, one or more downlink control channels may be detected by the terminal. The number of the downlink control channels is related to the terminal capability of the terminal.

Figure 3B:
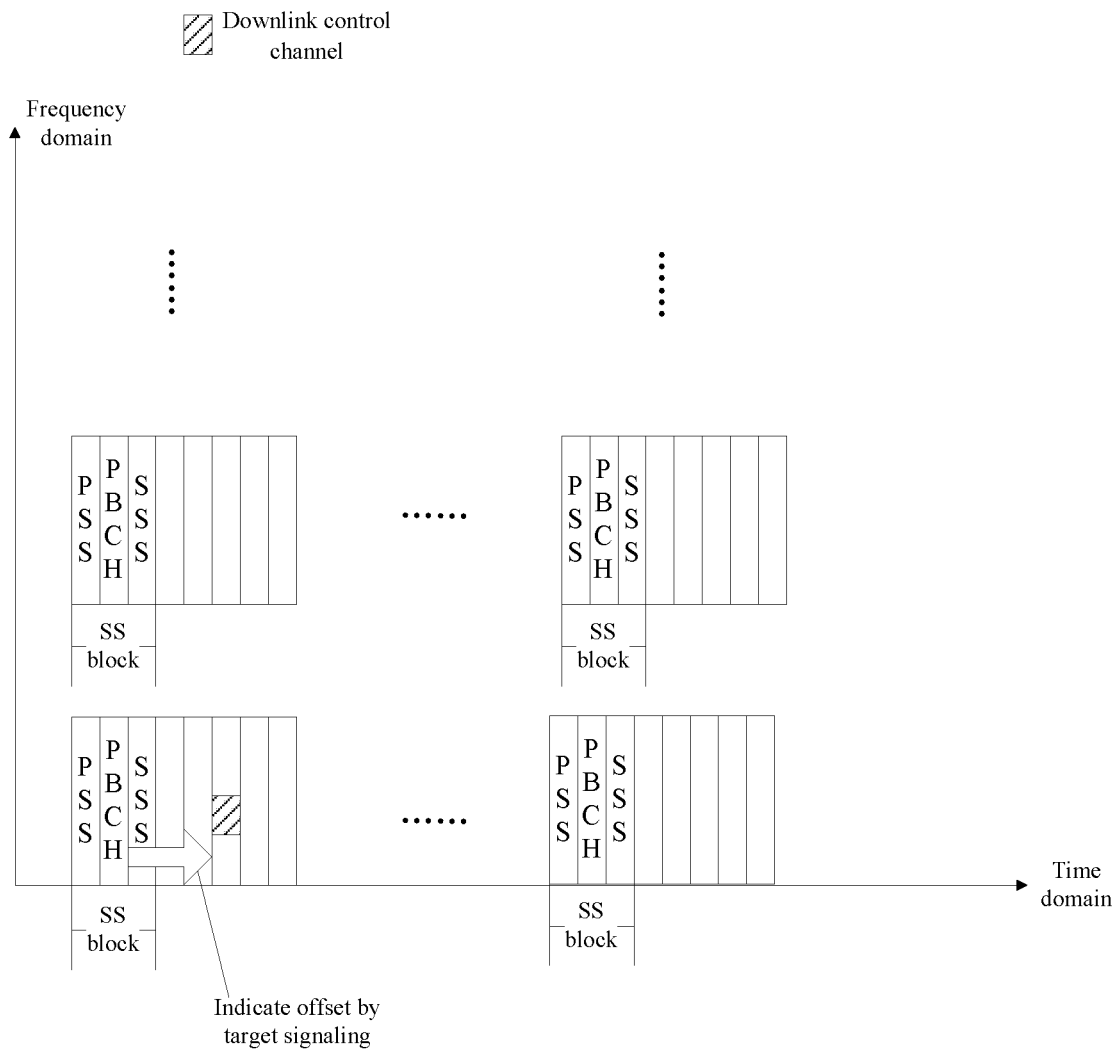

Alternatively, as shown in FIG. 3B, the target information may be information corresponding to a PBCH or an SS block, and the base station sends the offset or location information to the terminal by using the target signaling. Then, after receiving the target signaling, the terminal may determine, according to the offset, a target location corresponding to the downlink control channel.

In an embodiment, if the above target receiving manner includes receiving information about a target location of the downlink control channel corresponding to the time domain resource and the frequency domain resource, the target location may also be a preset location corresponding to the downlink control channel.

Optionally, the preset location may be predefined in a communication protocol between the terminal and the base station, for example, a certain location of the time domain resource and the frequency domain resource is fixedly predefined in the communication protocol for transmitting the downlink control channel.

Alternatively, the preset location is sent by the base station to the terminal by using target signaling. For example, the base station informs the terminal that the information of a certain location of the time domain resource and the frequency domain resource corresponds to the downlink control channel by using the target signaling.

Figure 4:
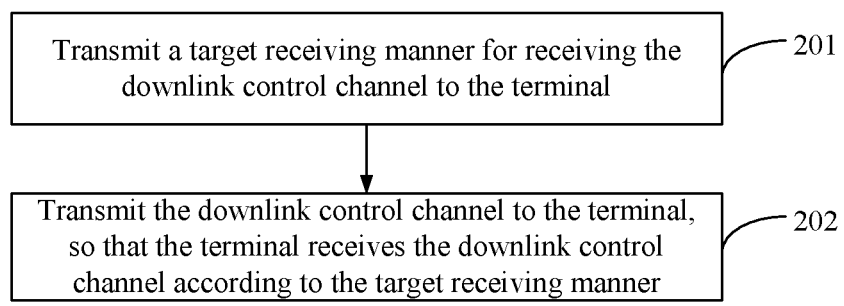
FIG. 4 is a flowchart of a method for transmitting a downlink control channel according to an exemplary embodiment.

An embodiment of the present disclosure provides a method for transmitting a downlink control channel, which may be used in a base station. Optionally, the downlink control channel is a downlink control channel for transmitting common control information, such as a PDCCH. FIG. 4 is a flowchart of a method for transmitting a downlink control channel according to an exemplary embodiment, which may include the following steps.

In step 201, a target receiving manner for receiving the downlink control channel is transmitted to the terminal.

In step 202, the downlink control channel is transmitted to the terminal, so that the terminal receives the downlink control channel according to the target receiving manner.

In the foregoing embodiment, the base station may send a target receiving manner for receiving the downlink control channel to the terminal, and send the downlink control channel to the terminal, and thus the terminal receives the downlink control channel according to the target receiving manner. Through the foregoing process, the base station can send the target receiving manner and the downlink control channel to the terminal, so that the terminal receives the downlink control channel according to the target receiving manner, which improves the performance of the 5G system.

For the foregoing step 201, the base station may send the target receiving manner to the terminal by using target signaling. Optionally, the target signaling includes at least one of the following: radio resource control signaling, system information, a media access control address control unit, and physical layer signaling.

When transmitting RRC signaling to the terminal, the base station may send the target receiving manner to the terminal by using the RRC signaling.

Alternatively, the base station may carry the target receiving manner in a broadcast system message.

The base station may further send the target receiving manner to the terminal by using a MAC CE.

The physical layer signaling is generally signaling carried by a PDCCH, such as Transport Format Combination Indicator (TFCI) signaling for indicating a format of transmission, and Transmit Power Control (TPC) signaling for power control, etc. In the embodiments of the present disclosure, the base station may further send the target receiving manner to the terminal by using the physical layer signaling.

Further, the target receiving manner may include at least one of the following:
  receiving information about a target location of the downlink control channel corresponding to the time domain resource and the frequency domain resource;
  searching a target search space corresponding to the downlink control channel;
  receiving according to a target modulation and coding manner;
  receiving according to a target period; and
  receiving a target beam for transmitting the downlink control channel.

The target location may be an offset of the downlink control channel with respect to target information, or a preset location corresponding to the downlink control channel. The target information is information corresponding to the channel or the information block received by the terminal before receiving the downlink control channel, and may be information corresponding to the PBCH or the SS block.

For the foregoing step 202, in the embodiments of the present disclosure, the base station may send the downlink control channel to the terminal(s) in the entire cell, or may send the downlink control channel to the terminal(s) in one of the terminal grouping according to the terminal groupings.

Further, the terminal may receive the downlink control channel according to the target receiving manner.

In the above embodiment, the target receiving manner is sent to the terminal by the base station through the target signaling, and subsequently, the terminal may receive the target signaling according to the target receiving manner, thereby improving the performance of the 5G system.

Figure 5:
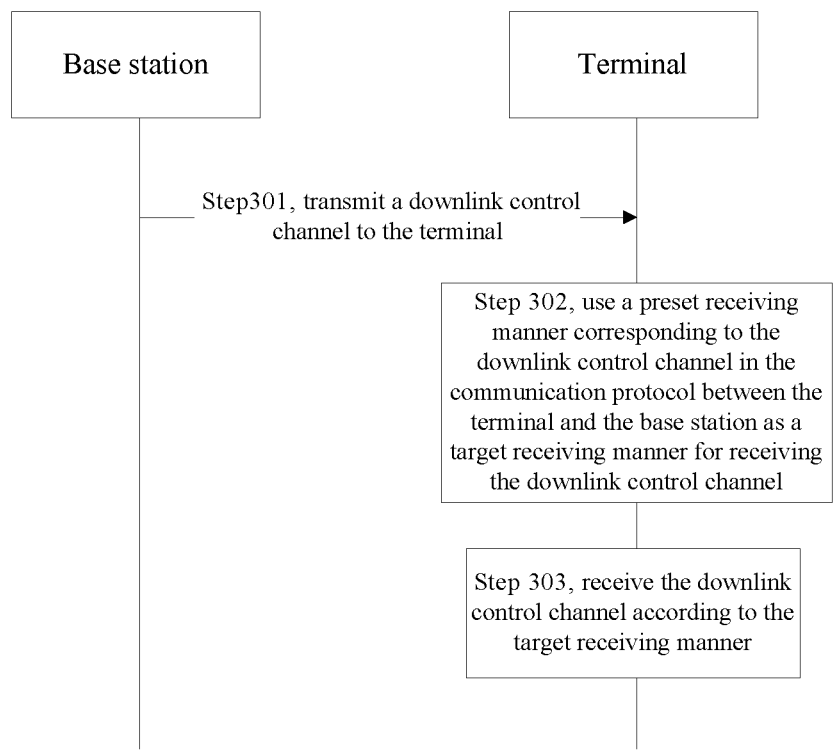
FIG. 5 is a flowchart of a method for transmitting and receiving a downlink control channel according to an exemplary embodiment.

FIG. 5 is a flowchart of a method for transmitting and receiving a downlink control channel according to an exemplary embodiment, which may include the following steps.

In step 301, the base station transmits a downlink control channel to the terminal.

In step 302, the terminal uses a preset receiving manner corresponding to the downlink control channel in the communication protocol between the terminal and the base station as a target receiving manner for receiving the downlink control channel.

In step 303, the terminal receives the downlink control channel according to the target receiving manner.

In the foregoing embodiment, the receiving manner corresponding to the downlink control channel has been determined in advance by using a communication protocol, and the terminal directly uses the preset receiving manner as the target receiving manner, so as to receive the downlink control channel. Optionally, if the preset receiving manner includes information about a target location of the downlink control channel corresponding to the time domain resource and the frequency domain resource, the target location may be a preset location of the downlink control channel or the offset of the downlink control channel with respect to the target information, and then the terminal may obtain the downlink control channel directly at the location of the corresponding time domain resource and the frequency domain resource.

Figure 6:
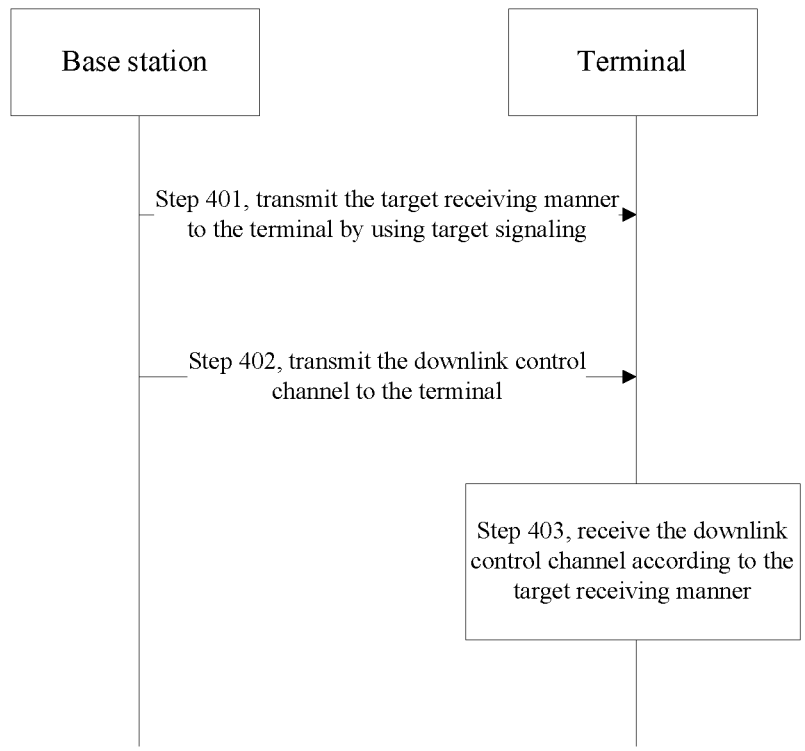
FIG. 6 is a flowchart of another method for transmitting and receiving a downlink control channel according to an exemplary embodiment.

FIG. 6 is a flowchart of another method for transmitting and receiving a downlink control channel according to an exemplary embodiment, which may include the following steps.

In step 401, the base station transmits the target receiving manner to the terminal by using target signaling.

In step 402, the base station transmits the downlink control channel to the terminal.

In step 403, the terminal receives the downlink control channel according to the target receiving manner.

In the foregoing embodiment, the target receiving manner is sent to the terminal by the base station by using the target signaling, and the terminal directly receives the downlink control channel according to the target receiving manner. Optionally, if the target receiving manner includes information about a target location of the downlink control channel corresponding to the time domain resource and the frequency domain resource, the target location may be a preset location of the downlink control channel or the offset with respect the target information, then the terminal may obtain the downlink control channel directly at the location of the corresponding time domain resource and the frequency domain resource.

Figure 7:
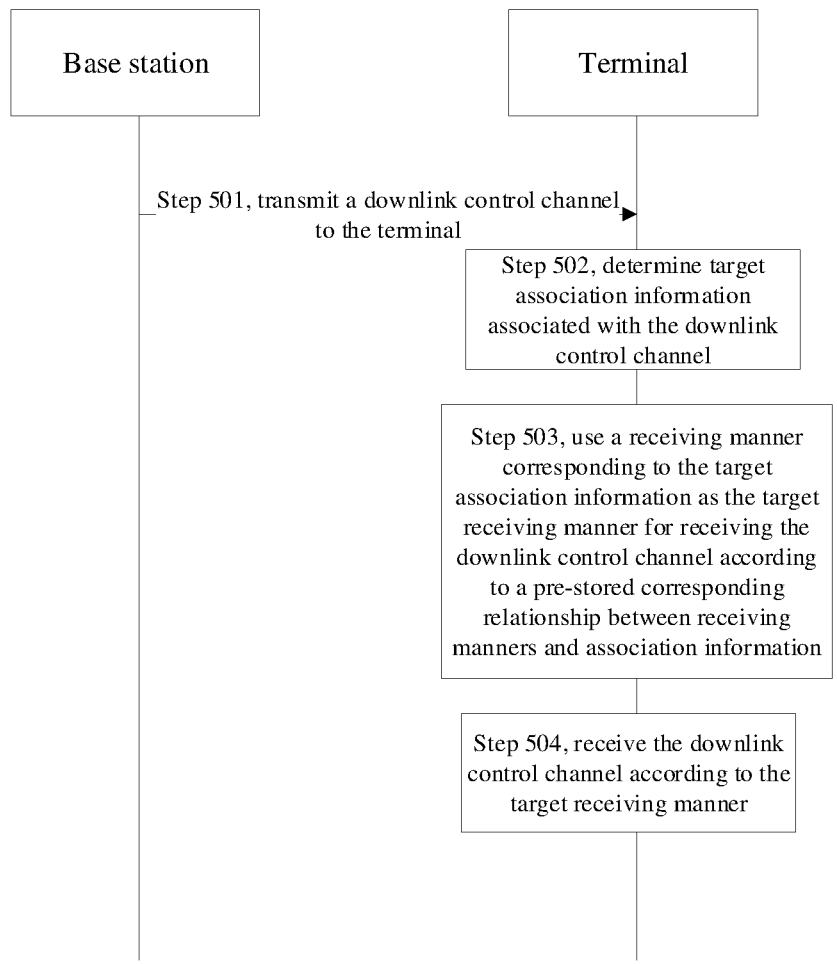
FIG. 7 is a flowchart of another method for transmitting and receiving a downlink control channel according to an exemplary embodiment.

FIG. 7 is a flowchart of another method for transmitting and receiving a downlink control channel according to an exemplary embodiment, which may include the following steps.

In step 501, a downlink control channel is transmitted to the terminal.

In step 502, the terminal determines target association information associated with the downlink control channel.

In step 503, the terminal uses a receiving manner corresponding to the target association information as the target receiving manner for receiving the downlink control channel according to a pre-stored corresponding relationship between the receiving manners and the association information.

In step 504, the terminal receives the downlink control channel according to the target receiving manner.

In the foregoing embodiment, the terminal may determine a corresponding receiving manner according to the target association information associated with the downlink control channel, and use the receiving manner as the target receiving manner to receive the downlink control channel.

Corresponding to the foregoing application function implementation method embodiments, the present disclosure also provides embodiments of an application function implementation apparatus and a corresponding terminal.

Figure 8:
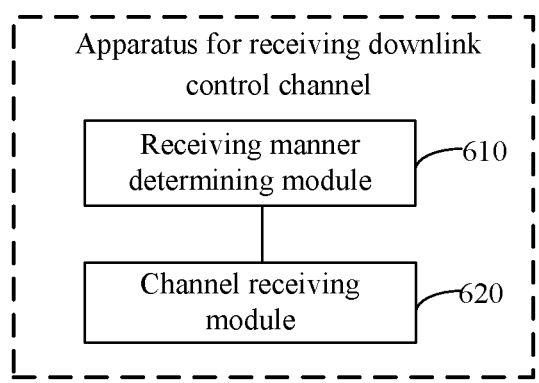
FIG. 8 is a block diagram of an apparatus for receiving a downlink control channel according to an exemplary embodiment.

FIG. 8 is a block diagram of an apparatus for receiving a downlink control channel according to an exemplary embodiment. Referring to FIG. 8, the apparatus is used for a terminal, and the apparatus includes:

a receiving manner determining module 610 configured to determine a target receiving manner for receiving the downlink control channel; and a channel receiving module 620 configured to receive the downlink control channel transmitted by a base station according to the target receiving manner.

Figure 9:
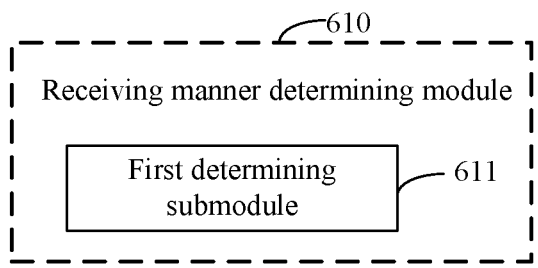
FIG. 9 is a block diagram of another apparatus for receiving a downlink control channel according to an exemplary embodiment.

FIG. 9 is a block diagram of another apparatus for receiving a downlink control channel based on the embodiment shown in FIG. 8. Referring to FIG. 9, the receiving manner determining module 610 includes:

a first determining submodule 611 configured to use a preset receiving manner corresponding to the downlink control channel in the communication protocol between the terminal and the base station as the target receiving manner for receiving the downlink control channel.

Figure 10:
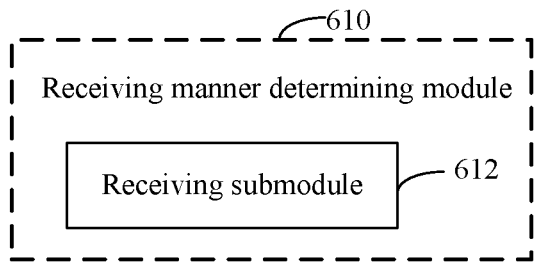
FIG. 10 is a block diagram of another apparatus for receiving a downlink control channel according to an exemplary embodiment.

FIG. 10 is a block diagram of another apparatus for receiving a downlink control channel based on the embodiment shown in FIG. 8. Referring to FIG. 10, the receiving manner determining module 610 includes:

a receiving submodule 612 configured to receive, by using target signaling, the target receiving manner for receiving the downlink control channel that is transmitted by the base station, wherein the target signaling includes at least one of the following:

radio resource control signaling, system information, a media access control address control unit, and physical layer signaling.

Figure 11:
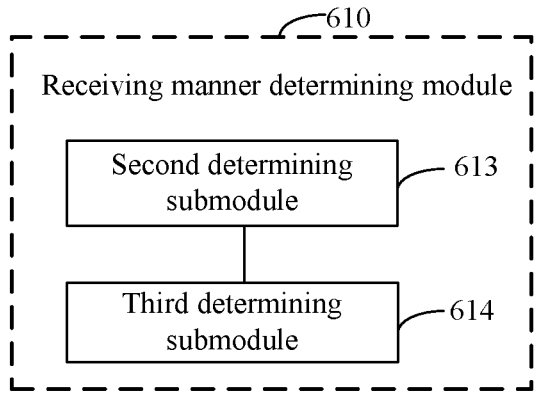
FIG. 11 is a block diagram of another apparatus for receiving a downlink control channel according to an exemplary embodiment.

FIG. 11 is a block diagram of another apparatus for receiving a downlink control channel based on the embodiment shown in FIG. 8. Referring to FIG. 11, the receiving manner determining module 610 includes:

a second determining submodule 613 configured to determine target association information associated with the downlink control channel; and a third determining submodule 614 configured to use, according to a pre-stored corresponding relationship between the receiving manners and the association information, a receiving manner corresponding to the target association information as the target receiving manner for receiving the downlink control channel.

Optionally, the association information includes at least one of the following:

a scrambling sequence that scrambles target information, where the target information is information corresponding to a channel or a block of information received by the terminal before receiving the downlink control channel; and a terminal grouping to which the terminal belongs.

Optionally, the target receiving manner includes at least one of the following:

receiving information about a target location of the downlink control channel corresponding to a time domain resource and a frequency domain resource;

searching a target search space corresponding to the downlink control channel;

receiving according to a target modulation and coding manner;

receiving according to a target period; and receiving a target beam for transmitting the downlink control channel.

Optionally, the target location includes:

an offset of the downlink control channel with respect to the target information; where the target information is information corresponding to a channel or a block of information received by the terminal before receiving the downlink control channel; or a preset location corresponding to the downlink control channel.

Figure 12:
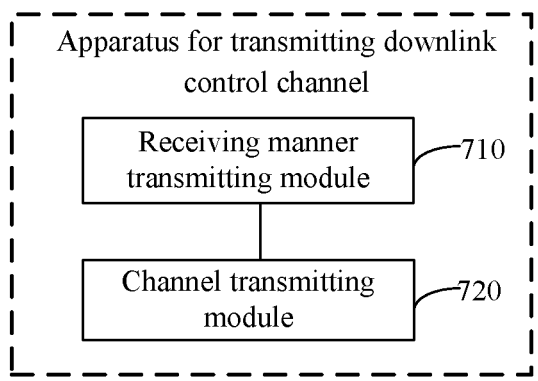
FIG. 12 is a block diagram of an apparatus for transmitting a downlink control channel according to an exemplary embodiment.

FIG. 12 is a block diagram of an apparatus for transmitting a downlink control channel according to an exemplary embodiment. Referring to FIG. 12, the apparatus is used in a base station, and the apparatus includes:

a receiving manner transmitting module 710 configured to transmit a target receiving manner for receiving the downlink control channel to the terminal; and The channel transmitting module 720 configured to transmit the downlink control channel to the terminal, so that the terminal receives the downlink control channel according to the target receiving manner.

Figure 13:
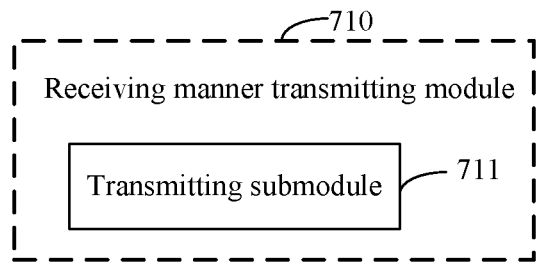
FIG. 13 is a block diagram of another apparatus for transmitting a downlink control channel according to an exemplary embodiment.

FIG. 13 is a block diagram of another apparatus for transmitting a downlink control channel based on the embodiment shown in FIG. 12. Referring to FIG. 13, the receiving manner transmitting module 710 includes:

a transmitting submodule 711 configured to transmit, by using target signaling, the target receiving manner for receiving the downlink control channel to the terminal;

wherein the target signaling includes at least one of the following:

radio resource control signaling, system information, a media access control address control unit, and physical layer signaling.

Optionally, the target receiving manner includes at least one of the following:

receiving information about a target location of the downlink control channel corresponding to the time domain resource and the frequency domain resource;

searching a target search space corresponding to the downlink control channel;

receiving according to a target modulation and coding manner;

receiving according to a target period; and receiving a target beam for transmitting the downlink control channel.

Optionally, the target location includes:

an offset of the downlink control channel with respect to target information; where the target information is information corresponding to a channel or an information block received by the terminal before receiving the downlink control channel; or a preset location corresponding to the downlink control channel.

For apparatus embodiments, since they are substantially corresponding to the method embodiments, the relevant contents may be referred to some explanations in the method embodiments. The above-described apparatus embodiments are only illustrative. The units illustrated as separate components may be or may not be separated physically, the component illustrated as a unit may be or may not be a physical unit, i.e., may be located at one location, or may be distributed into multiple network units. A part or all of the modules may be selected to achieve the purpose of the solution in the present disclosure according to actual requirements. The person skilled in the art can understand and implement the present disclosure without paying inventive labor.

Accordingly, the present disclosure further provides a computer readable storage medium storing a computer program for performing any of the above methods for receiving a downlink control channel.

Accordingly, the present disclosure further provides a computer readable storage medium storing a computer program for performing any of the above methods for transmitting a downlink control channel.

Accordingly, the present disclosure further provides an apparatus for receiving a downlink control channel, where the apparatus is used for a terminal, including:

a processor;

a memory for storing instructions executable by the processor;

wherein the processor is configured to:

determine a target receiving manner for receiving the downlink control channel; and receive the downlink control channel transmitted by a base station according to the target receiving manner.

Figure 14:
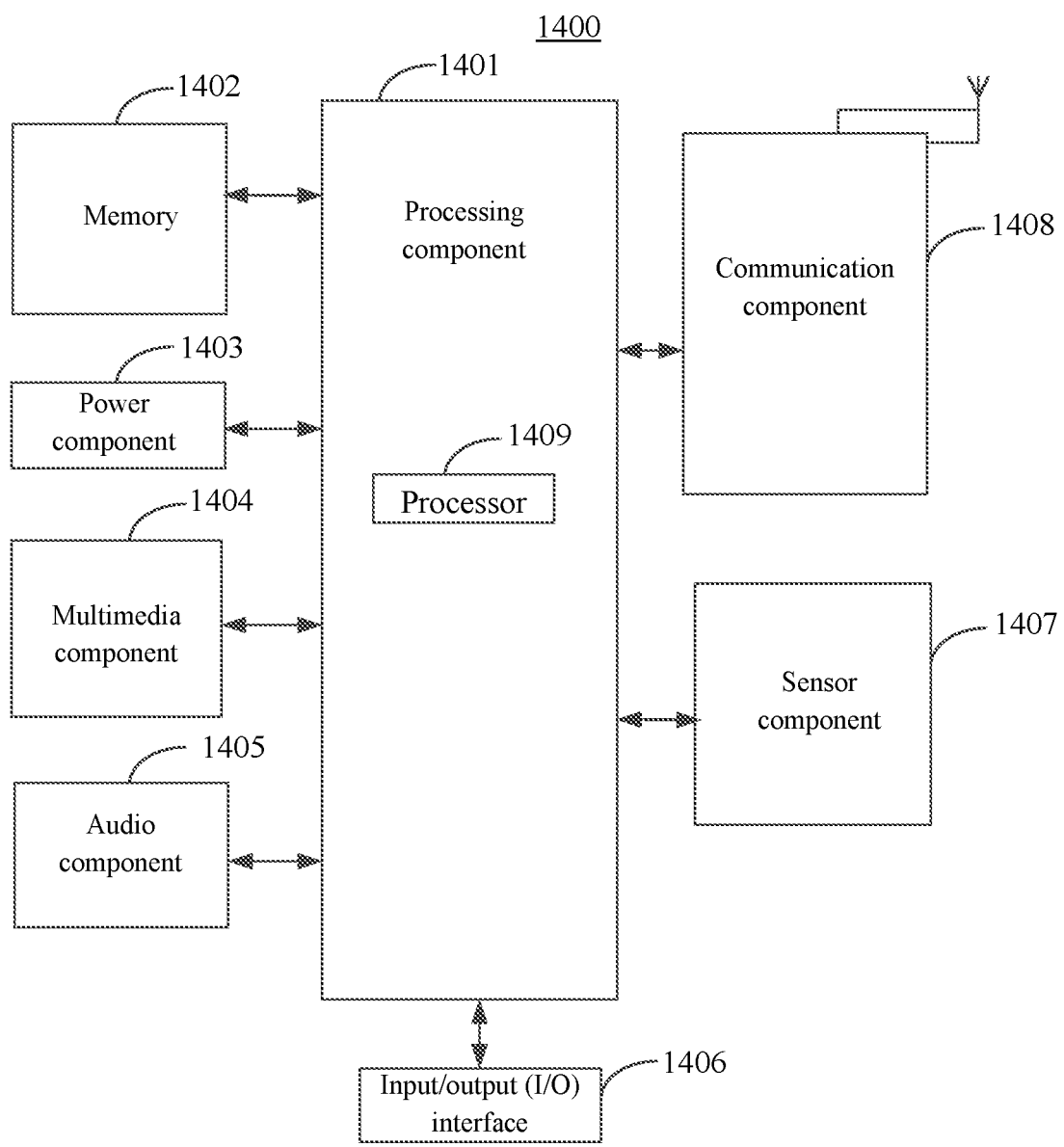
FIG. 14 is a schematic structural diagram of an apparatus for receiving a downlink control channel according to an exemplary embodiment of the present disclosure.

FIG. 14 is a schematic structural diagram of an apparatus for receiving a downlink control channel according to an exemplary embodiment. As shown in FIG. 14, the apparatus 1400 for receiving a downlink control channel according to an exemplary embodiment may be a computer, a mobile phone, a digital broadcast terminal, a messaging device, a gaming console, a tablet, a medical device, exercise equipment, a personal digital assistant, and other terminals.

Referring to FIG. 14, the apparatus 1400 may include one or more of the following components: a processing component 1401, a memory 1402, a power component 1403, a multimedia component 1404, an audio component 1405, an input/output (I/O) interface 1406, a sensor component 1407, and a communication component 1408.

The processing component 1401 typically controls overall operations of the apparatus 1400, such as the operations associated with display, telephone calls, data communications, camera operations, and recording operations. The processing component 1401 may include one or more processors 1409 to execute instructions to perform all or part of the steps in the above described methods. Moreover, the processing component 1401 may include one or more modules which facilitate the interaction between the processing component 1401 and other components. For instance, the processing component 1401 may include a multimedia module to facilitate the interaction between the multimedia component 1404 and the processing component 1401.

The memory 1402 is configured to store various types of data to support the operation of the apparatus 1400. Examples of such data include instructions for any applications or methods operated on the apparatus 1400, contact data, phonebook data, messages, pictures, video, etc. The memory 1402 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1403 provides power to various components of the apparatus 1400. The power component 1403 may include a power management system, one or more power sources, and any other components associated with the generation, management, and distribution of power in the apparatus 1400.

The multimedia component 1404 includes a screen providing an output interface between the apparatus 1400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1404 includes a front camera and/or a rear camera. The front camera and the rear camera may receive an external multimedia datum while the apparatus 1400 is in an operation mode, such as a photographing mode or a video mode. Each of the front camera and the rear camera may be a fixed optical lens system or have focus and optical zoom capability.

The audio component 1405 is configured to output and/or input audio signals. For example, the audio component 1405 includes a microphone ("MIC") configured to receive an external audio signal when the apparatus 1400 is in an operation mode, such as a call mode, a recording mode, and a voice recognition mode. The received audio signal may be further stored in the memory 1402 or transmitted via the communication component 1408. In some embodiments, the audio component 1405 further includes a speaker to output audio signals.

The I/O interface 1406 provides an interface between the processing component 1401 and peripheral interface modules, such as a keyboard, a click wheel, buttons, and the like. The buttons may include, but are not limited to, a home button, a volume button, a starting button, and a locking button.

The sensor component 1407 includes one or more sensors to provide status assessments of various aspects of the apparatus 1400. For instance, the sensor component 1407 may detect an open/closed status of the apparatus 1400, relative positioning of components, e.g., the display and the keypad, of the apparatus 1400, a change in position of the apparatus 1400 or a component of the apparatus 1400, a presence or absence of user contact with the apparatus 1400, an orientation or an acceleration/deceleration of the apparatus 1400, and a change in temperature of the apparatus 1400. The sensor component 1407 may include a proximity sensor configured to detect the presence of nearby objects without any physical contact. The sensor component 1407 may also include a light sensor, such as a CMOS or CCD image sensor, for use in imaging applications. In some embodiments, the sensor component 1407 may also include an accelerometer sensor, a gyroscope sensor, a magnetic sensor, a pressure sensor, or a temperature sensor.

The communication component 1408 is configured to facilitate communication, wired or wirelessly, between the apparatus 1400 and other devices. The apparatus 1400 can access a wireless network based on a communication standard, such as WiFi, 2G, or 3G, or a combination thereof. In one exemplary embodiment, the communication component 1408 receives a broadcast signal or broadcast association information from an external broadcast management system via a broadcast channel In one exemplary embodiment, the communication component 1408 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1402, executable by the processor 1409 in the apparatus 1400, for performing the above-described methods. For example, the non-transitory computer-readable storage medium may be a ROM, a RAM, a CD-ROM, a magnetic tape, a floppy disc, an optical data storage device, and the like.

When instructions in the storage medium are executed by the processor, the apparatus 1400 is enabled to execute any of the above methods for receiving the downlink control channel.

Accordingly, the present disclosure further provides an apparatus for transmitting a downlink control channel, where the apparatus is used for a base station, including:
    a processor;
    a memory for storing instructions executable by the processor;
    wherein the processor is configured to:
        transmit a target receiving manner for receiving the downlink control channel to a terminal; and
        transmit the downlink control channel to the terminal, so that the terminal receives the downlink control channel according to the target receiving manner.

Figure 15:
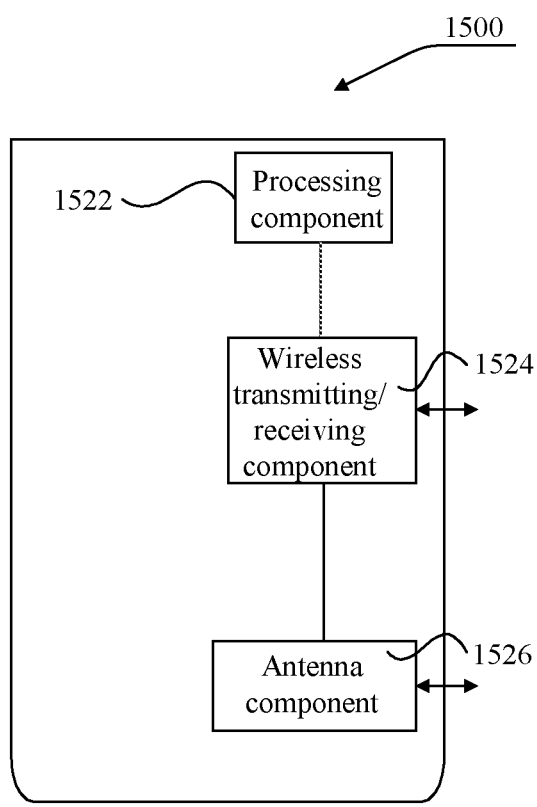
FIG. 15 is a schematic structural diagram of an apparatus for transmitting a downlink control channel according to an exemplary embodiment of the present disclosure.

FIG. 15 is a schematic structural diagram of an apparatus 1500 for transmitting a downlink control channel according to an exemplary embodiment. The apparatus 1500 may be provided as a base station. As shown in FIG. 15, the apparatus 1500 includes a processing component 1522, which may further include one or more processors, a wireless transmitting/receiving component 1524, an antenna component 1526, and a signal processing portion that is specific to a wireless interface.

One of the processors in the processing component 1522 may be configured to perform any of the above methods for transmitting a downlink control channel.

Other embodiments of the present disclosure will be apparent to those skilled in the art from consideration of the specification and practice of the disclosure disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for receiving a downlink control channel, performed by a terminal, the method comprising:
    determining a target receiving manner for receiving the downlink control channel according to target association information associated with the downlink control channel, wherein the target association information comprises a scrambling sequence for scrambling target information, wherein when the terminal attempts to demodulate the target information by using a plurality of pre-stored scrambling sequences, a scrambling sequence that successfully demodulates the target information is the target association information; and receiving the downlink control channel transmitted by a base station according to the target receiving manner, wherein the target receiving manner is configured to indicate, by location information, a search space of the downlink control channel.

2. The method according to claim 1, wherein determining the target receiving manner for receiving the downlink control channel according to target association information associated with the downlink control channel comprises:

determining the target association information associated with the downlink control channel; and adopting a receiving manner corresponding to the target association information as the target receiving manner for receiving the downlink control channel according to a pre-stored corresponding relationship between receiving manners and association information.

3. The method according to claim 2, wherein the target association information further comprises a terminal grouping to which the terminal belongs.

4. The method according to claim 1, wherein the target receiving manner comprises at least one of:

receiving information about a target location of the downlink control channel corresponding to a time domain resource and a frequency domain resource;

searching a target search space corresponding to the downlink control channel;

receiving according to a target modulation and coding manner;

receiving according to a target period; and receiving a target beam for transmitting the downlink control channel.

5. The method according to claim 4, wherein the target location comprises:

an offset of the downlink control channel with respect to target information, wherein the target information is information corresponding to a channel or an information block received by the terminal before receiving the downlink control channel; or a preset location corresponding to the downlink control channel.

6. A method for transmitting a downlink control channel, performed by a base station, the method comprising:

transmitting a target receiving manner for receiving the downlink control channel to a terminal according to target association information associated with the downlink control channel, wherein the target association information comprises a scrambling sequence for scrambling target information for the terminal, wherein when the terminal attempts to demodulate the target information by using a plurality of pre-stored scrambling sequences, a scrambling sequence that successfully demodulates the target information is the target association information; and transmitting the downlink control channel to the terminal, so that the terminal receives the downlink control channel according to the target receiving manner, wherein the target receiving manner is configured to indicate, by location information, a search space of the downlink control channel.

7. The method according to claim 6, wherein the target receiving manner comprises at least one of:

receiving information about a target location of the downlink control channel corresponding to a time domain resource and a frequency domain resource;

searching a target search space corresponding to the downlink control channel;

receiving according to a target modulation and coding manner;

receiving according to a target period; and receiving a target beam for transmitting the downlink control channel.

8. The method according to claim 7, wherein the target location comprises:

an offset of the downlink control channel with respect to target information, wherein the target information is information corresponding to a channel or an information block received by the terminal before receiving the downlink control channel; or a preset location corresponding to the downlink control channel.

9. An apparatus for receiving a downlink control channel, used in a terminal, the apparatus comprising:

a processor; and a memory for storing instructions executable by the processor;

wherein the processor is configured to:

determine a target receiving manner for receiving the downlink control channel according to target association information associated with the downlink control channel, wherein the target association information comprises a scrambling sequence for scrambling target information, wherein when the terminal attempts to demodulate the target information by using a plurality of pre-stored scrambling sequences, a scrambling sequence that successfully demodulates the target information is the target association information; and receive the downlink control channel transmitted by a base station according to the target receiving manner, wherein the target receiving manner is configured to indicate, by location information, a search space of the downlink control channel.

10. The apparatus according to claim 9, wherein the processor is further configured to:

determine the target association information associated with the downlink control channel; and adopt a receiving manner corresponding to the target association information as the target receiving manner for receiving the downlink control channel according to a pre-stored corresponding relationship between receiving manners and association information.

11. The apparatus according to claim 10, wherein the target association information further comprises a terminal grouping to which the terminal belongs.

12. The apparatus according to claim 9, wherein the target receiving manner comprises at least one of:

receiving information about a target location of the downlink control channel corresponding to a time domain resource and a frequency domain resource;

searching a target search space corresponding to the downlink control channel;

receiving according to a target modulation and coding manner;

receiving according to a target period; and receiving a target beam for transmitting the downlink control channel.

13. The apparatus according to claim 12, wherein the target location comprises:

an offset of the downlink control channel with respect to target information, wherein the target information is information corresponding to a channel or an information block received by the terminal before receiving the downlink control channel; or a preset location corresponding to the downlink control channel.

14. An apparatus for transmitting a downlink control channel, performed by a base station, the apparatus comprising:
    a processor; and
    a memory for storing instructions executable by the processor,
    wherein the processor is configured to: perform the method according to the claim 6.

15. The method according to claim 1, wherein determining the target receiving manner for receiving the downlink control channel according to the target association information associated with the downlink control channel comprises:
    determining, from a plurality of receiving manners, the target receiving manner for receiving the downlink control channel according to the target association information associated with the downlink control channel.

16. The method according to claim 6, wherein determining the target receiving manner for receiving the downlink control channel according to the target association information associated with the downlink control channel comprises:
    determining, from a plurality of receiving manners, the target receiving manner for receiving the downlink control channel according to the target association information associated with the downlink control channel.

17. The apparatus according to claim 9, wherein the determining the target receiving manner for receiving the downlink control channel according to the target association information associated with the downlink control channel comprises:
    determining, from a plurality of receiving manners, the target receiving manner for receiving the downlink control channel according to the target association information associated with the downlink control channel.

* * * * *